United States Patent
Smith

(10) Patent No.: US 8,534,974 B2
(45) Date of Patent: Sep. 17, 2013

(54) THREAD CLAMPING DEVICE WITH IMPROVED LOCKING DISTANCE

(76) Inventor: Ronald A. Smith, Los Gatos, CA (US)

(\*) Notice: Subject to any disclaimer, the term of this patent is extended or adjusted under 35 U.S.C. 154(b) by 848 days.

(21) Appl. No.: 12/309,574

(22) PCT Filed: Jul. 27, 2007

(86) PCT No.: PCT/US2007/016862
§ 371 (c)(1),
(2), (4) Date: Jan. 23, 2009

(87) PCT Pub. No.: WO2008/016543
PCT Pub. Date: Feb. 7, 2008

(65) Prior Publication Data
US 2009/0324364 A1    Dec. 31, 2009

Related U.S. Application Data

(60) Provisional application No. 60/833,961, filed on Jul. 29, 2006.

(51) Int. Cl.
*F16B 39/26* (2006.01)

(52) U.S. Cl.
USPC ........... 411/261; 411/262; 411/266; 411/267; 411/268

(58) Field of Classification Search
USPC ............. 411/261, 262, 266, 267, 268; 52/27, 52/223.1
See application file for complete search history.

(56) References Cited

U.S. PATENT DOCUMENTS

| | | | | |
|---|---|---|---|---|
| 2,576,579 A * | 11/1951 | Donovan | | 411/267 |
| 2,896,496 A * | 7/1959 | Jansen | | 411/347 |
| 3,334,536 A * | 8/1967 | Armstrong | | 411/434 |
| 3,703,843 A * | 11/1972 | Laverty | | 411/413 |
| RE28,111 E * | 8/1974 | Laverty | | 411/412 |
| 3,861,269 A * | 1/1975 | Laverty | | 411/413 |
| 4,850,777 A | 7/1989 | Lawrence et al. | | 411/433 |
| 4,974,888 A * | 12/1990 | Childers | | 292/251 |
| 4,975,014 A * | 12/1990 | Rufin et al. | | 411/385 |
| 5,090,857 A * | 2/1992 | Dunn | | 411/385 |
| 5,885,042 A * | 3/1999 | Jonatzke | | 411/386 |
| 6,655,104 B2 * | 12/2003 | Kadotani et al. | | 52/647 |
| 6,712,574 B1 * | 3/2004 | Roopnarine | | 411/433 |
| 6,761,002 B1 * | 7/2004 | Sorkin | | 52/223.13 |
| 6,905,297 B2 | 6/2005 | DiStasio et al. | | 411/329 |

\* cited by examiner

*Primary Examiner* — Roberta Delisle
(74) *Attorney, Agent, or Firm* — George Wolken, Jr.

(57) ABSTRACT

A thread clamping device is described including a plurality of movable nut segments around a threaded rod, and spring members flexibly holding the segments against the rod. Smaller locking distances are shown to result by using at least one double-threaded segment as a component of the thread clamping device. Such a thread clamping device can advantageously be used as a component of a self-adjusting shrinkage compensation device, a coupler for threaded rods, hold-downs, among other uses.

5 Claims, 21 Drawing Sheets

THREAD CLAMPING DEVICE WITH IMPROVED LOCKING DISTANCE

BACKGROUND OF THE INVENTION

1. Field of Invention

This invention relates generally to the field of fastening devices and methods of use, and more particularly to threaded fasteners and thread clamping devices having improved locking characteristics in the ratcheting direction.

2. Description of the Prior Art

Wood is a major construction material in many places throughout the world. Wooden structures frequently use "tie-downs" to secure the wooden structure to its foundation, typically a concrete foundation or a concrete and block foundation. The function of tie-downs is thus to secure the wooden structure to its foundation in the presence of forces (perhaps substantial forces) tending to separate the structure from its foundation, such as high winds, seismic events or general shifting and settling of the surrounding earth. However, the wood typically used for construction often has considerable water content when initially installed and with time, the water evaporates and the wood dries out. In the process of drying out, the wood dimensionally shrinks. Approximately 4% shrinkage in the first year following construction of a wooden structure is not uncommon.

This shrinkage commonly causes tie-downs to loosen, thereby making the structure more susceptible to damaging displacements in the presence of high winds, earthquakes among other external forces. Catastrophic damage may result.

A common method for implementing a tie-down is by imbedding a vertical threaded rod into the concrete of the foundation at the location where the wooden structure is to be joined to the foundation. The threaded rod generally resides within the walls of a single or multilevel structure as it passes from the concrete foundation up through each floor of the structure. Each floor is typically attached to the threaded rod by a separate tie-down. The primary fastener presently used to implement a tie-down is a standard "hex" nut.

If a standard nut is used, a space will typically develop under the standard nut and above the wood as the wood shrinks in dimension due to loss of water as described above. This space allows the tie-down (and structure) to move vertically when an overturning moment is applied to the structure as might occur, for example, during a seismic event, wind loading, among other circumstances. This motion of the structure with respect to the foundation, in turn, allows for deformation of the structural walls and may produce substantial damage that the tie-down is designed to prevent when functioning properly, that is when holding the structure securely in place on the foundation. Thus, a need exists in the art for a tie-down that is self-compensating, that is, a tie-down that maintains secure attachment of the structure to the foundation despite shrinkage of the wood.

The International Codes Council ("ICC") has recently adopted Acceptance Criteria ("AC"), AC316, that require Tension Controlled Shrinkage Compensation Devices ("TCSCD") to meet certain performance criteria. Among these is a requirement that the deflection of the TCSCD under load is limited to 0.125 inch minus "looseness." "Looseness" as used in this AC is defined as the distance the threaded rod must be moved in the locking direction relative to the TCD before the TCD segments lock to the rod.

Receiving formal ICC approval for a device is an important commercial advantage in the US market. But ICC approval is based upon successfully passing independent performance tests and evaluations, providing strong evidence of the devices' capabilities, even in those locations in which formal ICC approval is not called for. Thus, a need exists in the art for a TCD meeting ICC AC, and also demonstrating improved overall performance.

SUMMARY OF THE INVENTION

Accordingly and advantageously the present invention relates to thread clamping devices ("TCD") and also to a TCD in combination with a bearing plate and various fasteners to form a self-adjusting shrinkage compensation device. Double-threaded nut segments are employed in connection with some TCD devices leading to a shorter locking distance for the TCD on the threaded rod and also improved strength, reliability, ease of use and/or other improved performance criteria.

Some embodiments of the TCDS described herein employ a combination of ¼ thread phasing (four identical segments) and a double-thread configuration on one or more segments engaging a single-threaded rod.

In view of the foregoing, in accordance with various embodiments of the present invention, a TCD is provided which may be advantageously configured pursuant to some embodiments of the present invention to move axially along a threaded rod in one direction without rotation ("ratcheting"), and further, will not move axially in the opposite direction without rotation. Indeed, in one embodiment, the TCD when combined with a bracket or bearing plate may become a "tie-down" for use in construction or for other purposes.

A bearing plate to distribute the load and to prevent medium crushing is typically attached to the shrinking medium (such as wood) using any convenient attaching means such as traditional screws, nails, rivets, adhesives, among others. The bearing plate is typically sandwiched between the TCD and the shrinking medium. That is, the bearing plate is located between the TCD and the shrinking medium. For typical wooden construction, a threaded rod protrudes vertically from a concrete foundation and upwards through components of the wooden structure such as a wooden wall top plate for single level construction or floor plate for the above floors in multilevel construction. Thus, the TCD is "on" the rod above the bearing plate (where "on" denotes having the rod passing through the TCD and engaging therewith). In this manner, as shrinkage of the wood occurs, the screws typically attaching the TCD to the top plate or floor plate would pull the TCD downward with respect to the threaded rod. Each time the TCD moves a certain distance downward (the "locking distance," typically at least one quarter (¼) thread), the TCD pursuant to some embodiments of the present invention has a structure that permits the TCD to internally ratchet and lock in place, thus preventing the TCD from moving upward with respect to the threaded rod (where the threaded rod itself cannot move as one end is buried in concrete during the construction process). Thus, the TCD maintains a tight tie-down despite shrinkage.

In addition, some embodiments are specifically configured to use segments with a double thread to reduce or minimize the distance the TCD must move along the axis of the threaded rod before ratcheting occurs. Double-threaded segments can improve ratcheting performance whether the segments are identical or not, and also whether the segments have substantially planar or frusto-conical surfaces.

Once ratcheting has occurred, some embodiments of include specific structures allowing the use of segments with double threads to reduce or minimize the linear distance the TCD is able to move without rotation in the opposite (non-ratcheting) direction before the TCD segments lock with the threaded rod. This performance characteristic of the TCD often called "looseness" or "looseness in the non-ratcheting direction."

A double-threaded segment engaging a single-threaded rod causes the thread ratcheting device, such as the TCD, to ratchet more often (that is, over a shorter linear distance along the rod) than would occur with a single-threaded segment engaging a single-threaded rod.

Additionally, some embodiments relate to methods of attaching TCDs to commercially available "hold downs." Hold downs attach to the medium subject so shrinkage (such as wood) and provide load distribution substantially similar to a bearing plate. Both mechanical and magnetic methods of TCD attachment to hold downs are described.

Yet another advantage of TCDs in comparison with traditional hex nuts is that the TCD can typically successfully engage a damaged threaded rod, even in cases where a substantial portion of the threads of the rod have been deformed to the point where a standard hex nut will jam.

An important performance criteria for the TCD, particularly in light of ICC AC316 discussed above, is to cause the locking distance to be sufficiently small such that the ICC AC is met. Thus, an objective of the present TCD is to provide a TCD having a small locking distance.

Yet another objective of the present TCD to provide a device meeting ICC criteria and passing ICC tests.

These and other features and advantages of the present invention will be understood upon consideration of the following detailed description of the invention and the accompanying drawings.

BRIEF DESCRIPTION OF THE DRAWINGS

To facilitate understanding, identical reference numerals have been used, where possible, to designate identical elements that are common to the figures. The drawings herein are schematic, not to scale and the relative dimensions of various elements in the drawings are not to scale.

Some of the drawings depict threaded structures having internal threads, external threads or both. An artifact in the drawing program produces threads whose depiction in the figures may appear as lacking the true spiral structure of actual threads, although the thread profile is usually depicted properly. However, the threads are depicted herein for purposes of explaining various structures, embodiments and/or other features or uses in connection with the present invention, and the possible apparent absence of spirals in the depiction does not affect the description of the invention.

Figure 1:
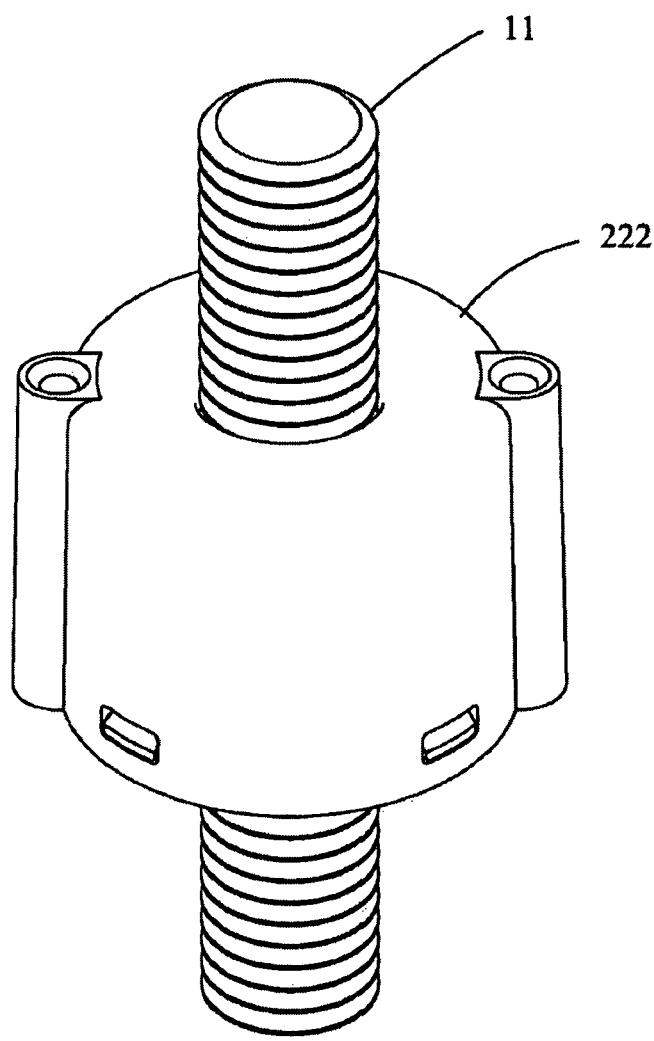

The techniques of the present invention can readily be understood by considering the following detailed description in conjunction with the accompanying drawings, in which:

FIG. 1 is a perspective view of a typical TCD on a threaded rod.

Figure 2:
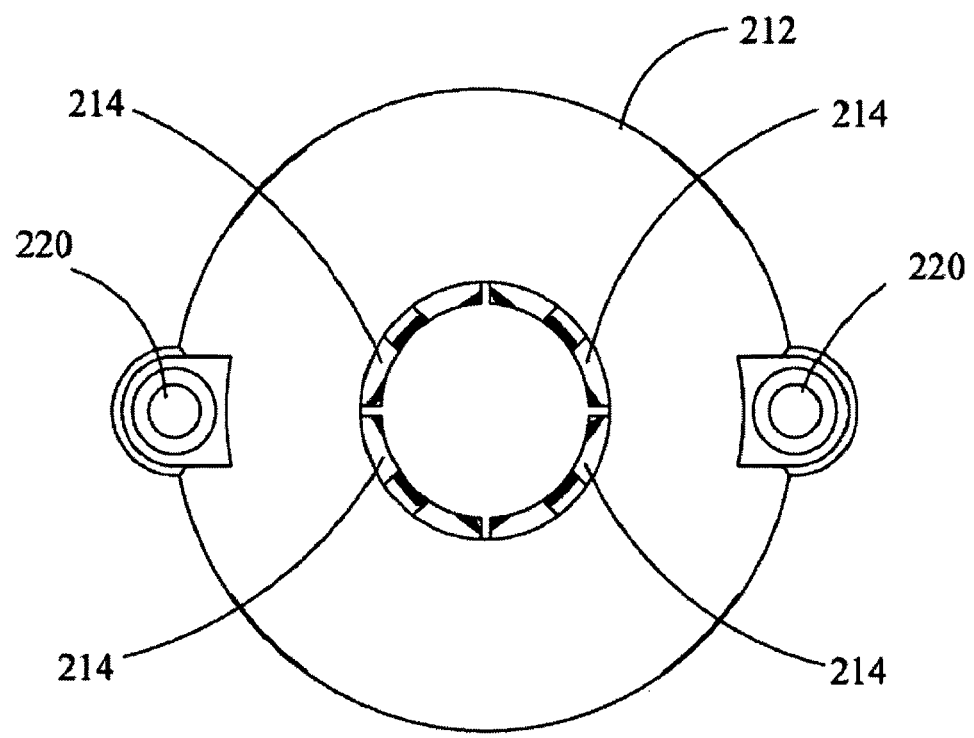

FIG. 2 is a top view of a typical TCD without threaded rod.

Figure 3:
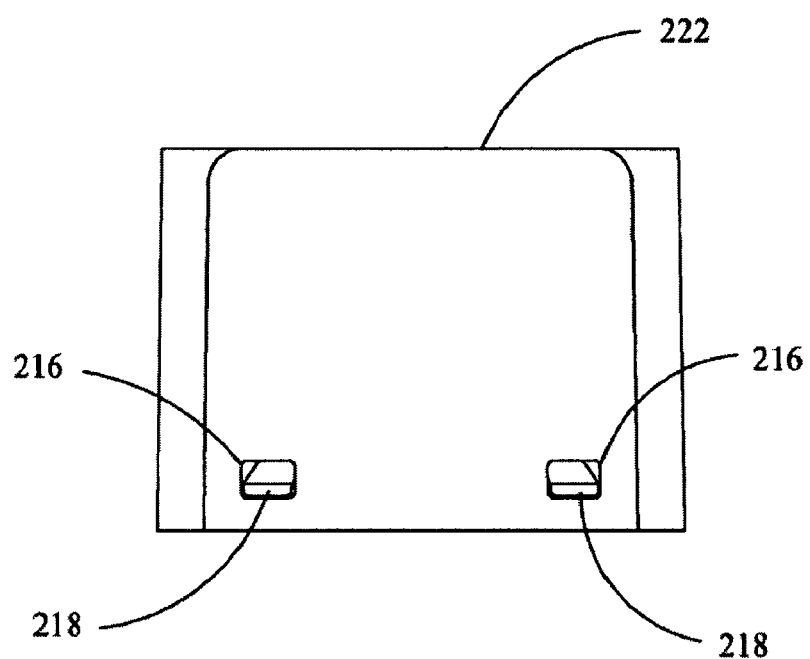

FIG. 3 is a first side view of a typical TCD.

Figure 4:
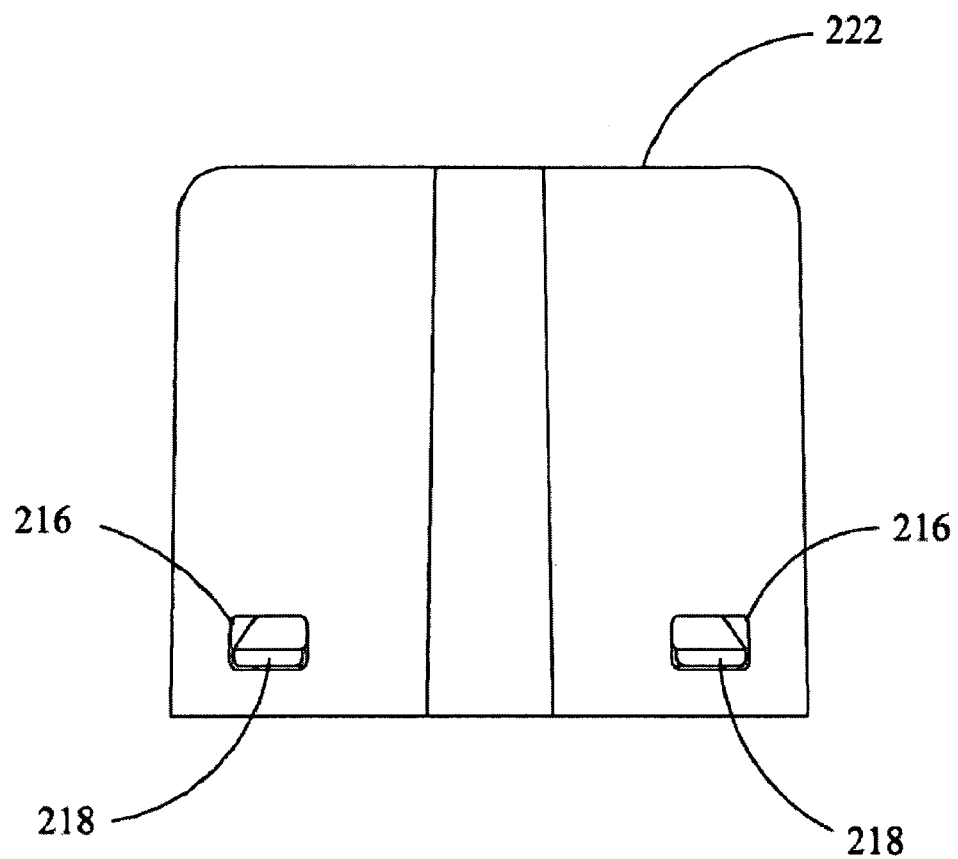

FIG. 4 is a second side view of a typical TCD.

Figure 5:
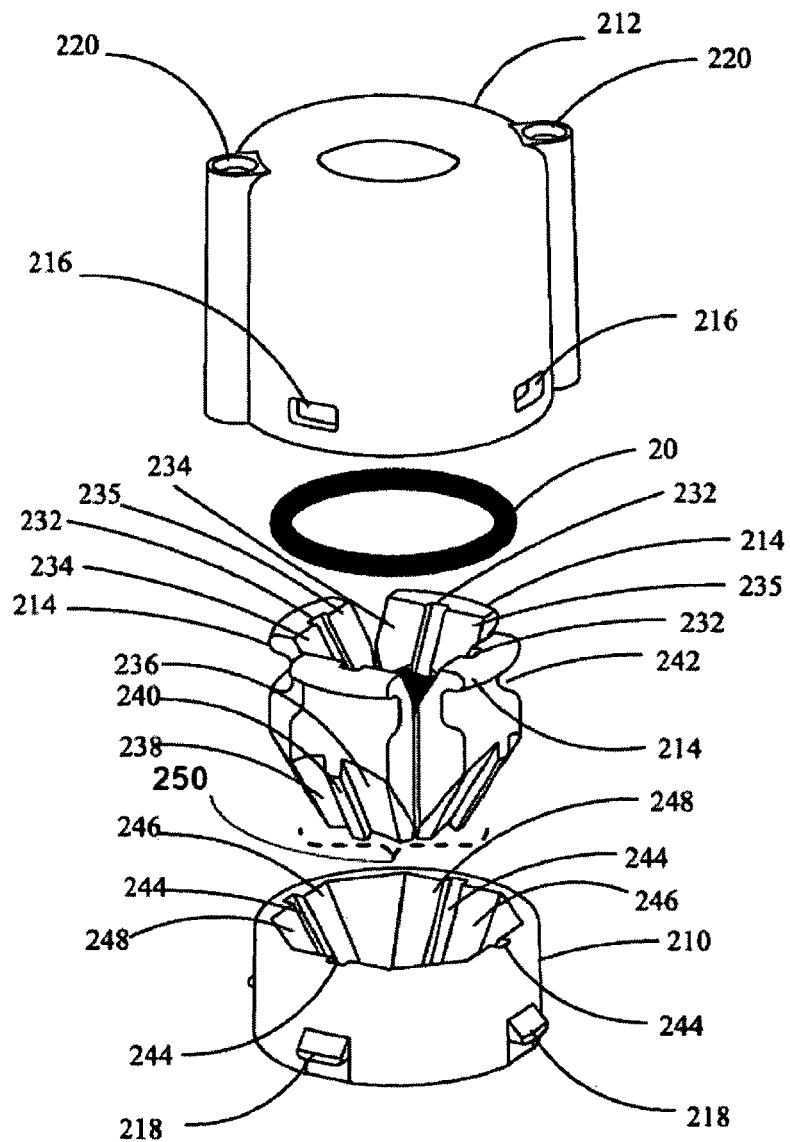

FIG. 5 is a top perspective three dimensional view of a TCD disassembled.

Figure 6:
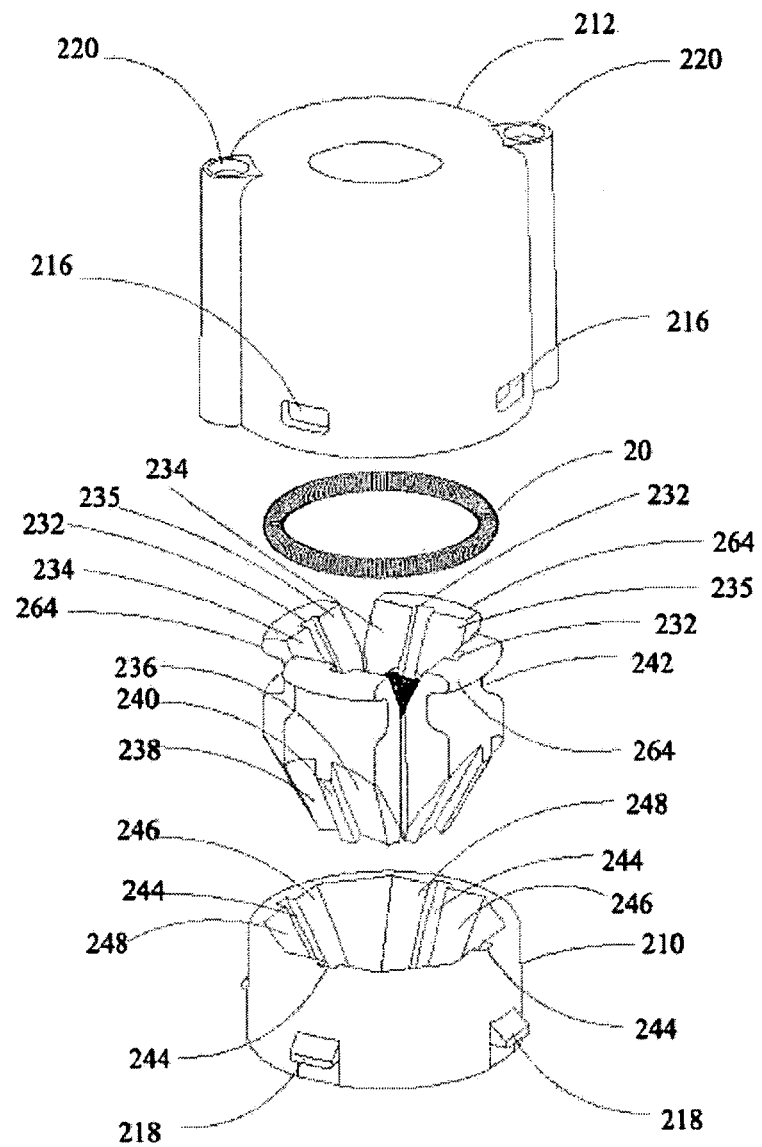

FIG. 6 is a top perspective three dimensional view of a TCD disassembled.

Figure 7:
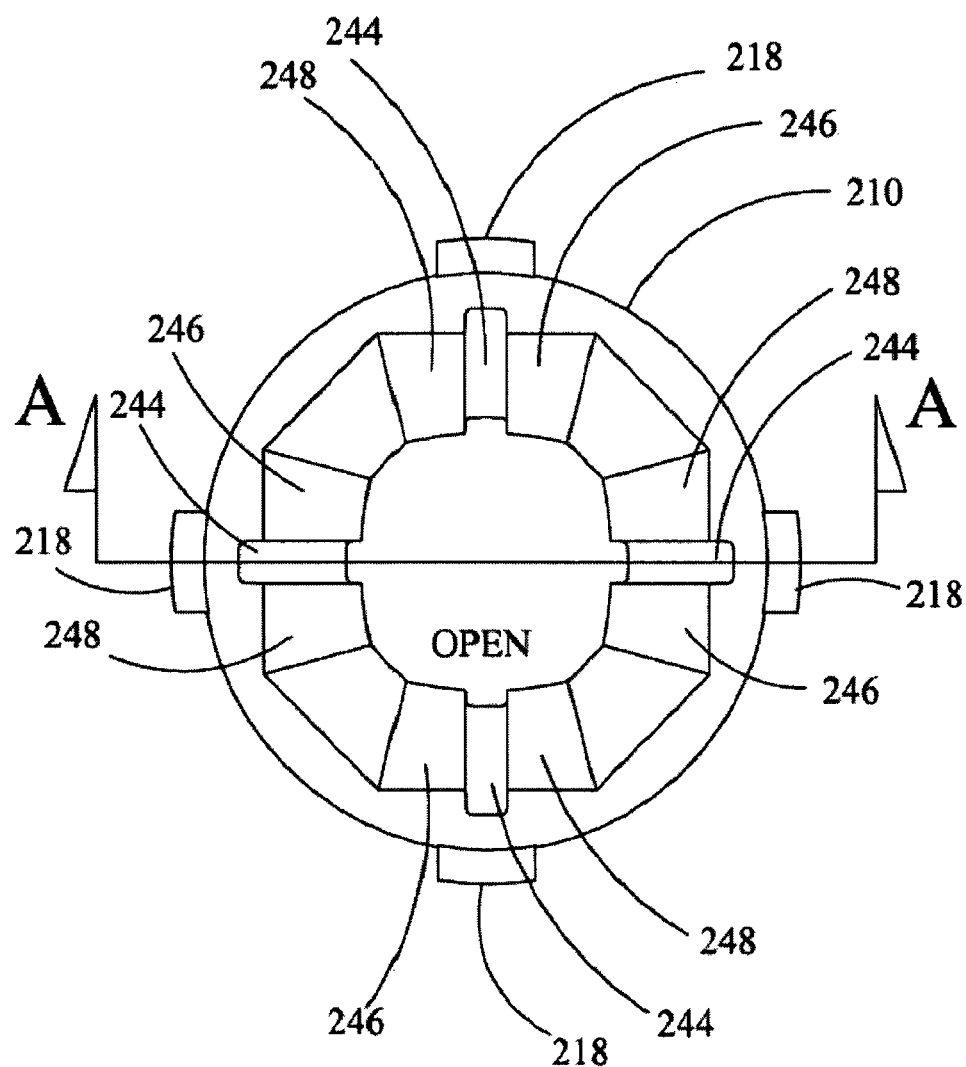

FIG. 7 is a top view of a typical end housing.

Figure 8:
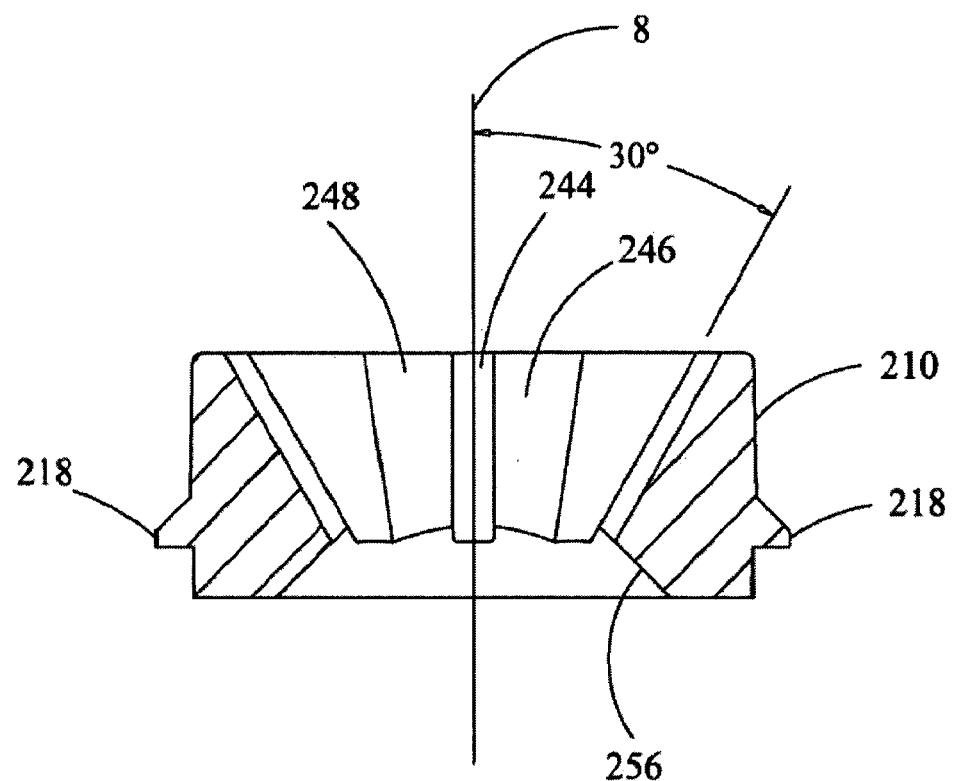

FIG. 8 is a sectioned view of the end housing of FIG. 7.

Figure 9:
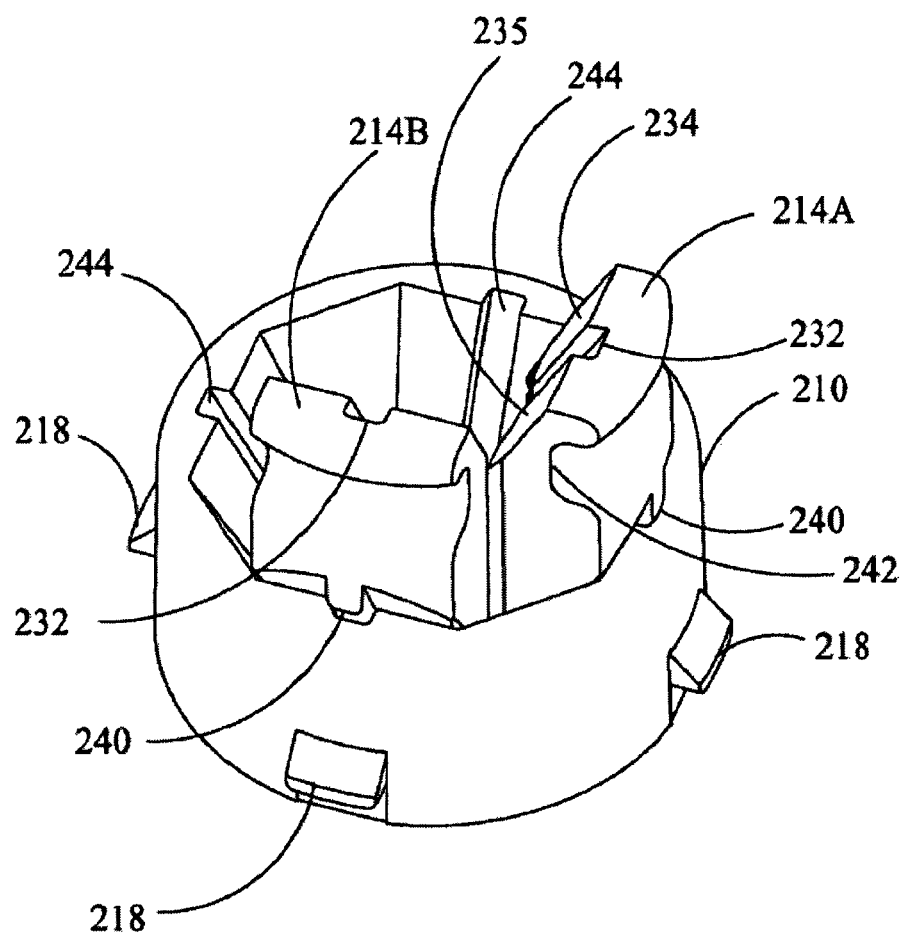

FIG. 9 is a three dimensional top perspective view of an end housing and two segments in different positions.

Figure 10:
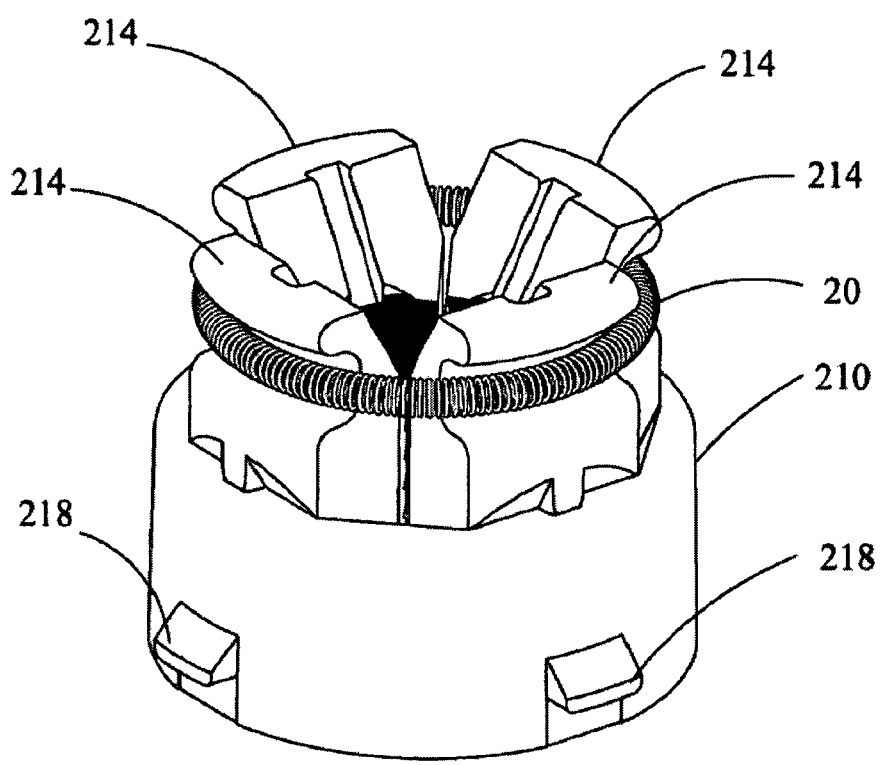

FIG. 10 is a three dimensional top perspective view of an end housing and four segments.

Figure 11:
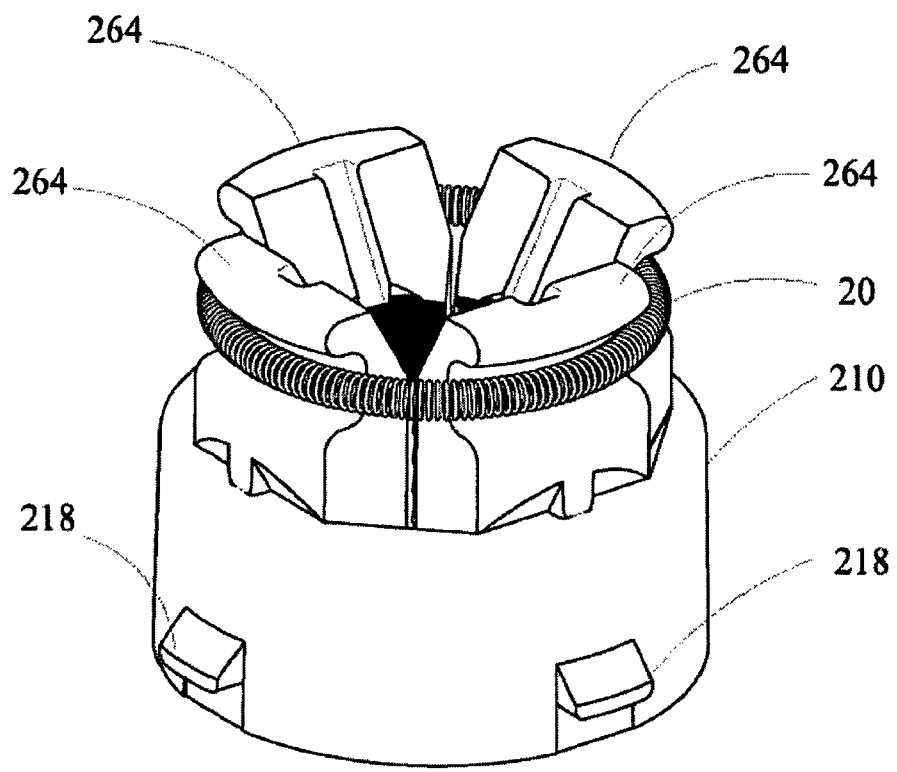

FIG. 11 is a three dimensional top perspective view of an end housing and four segments.

Figure 12:
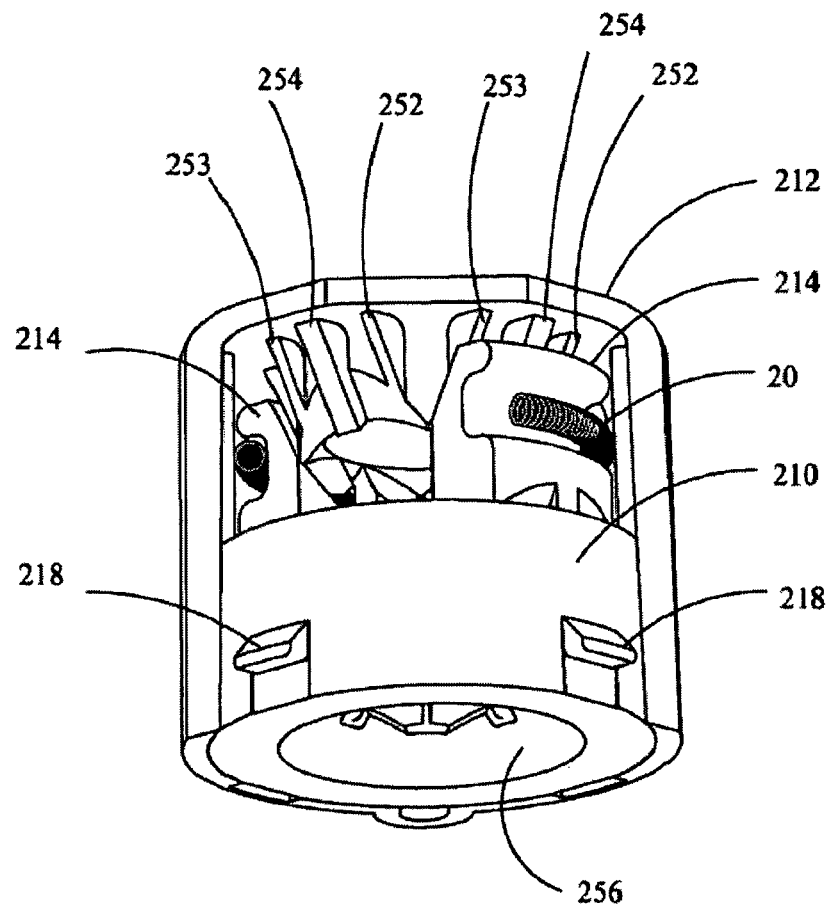

FIG. 12 is a bottom perspective view of a TCD with top housing partially removed to reveal internal components.

Figure 13:
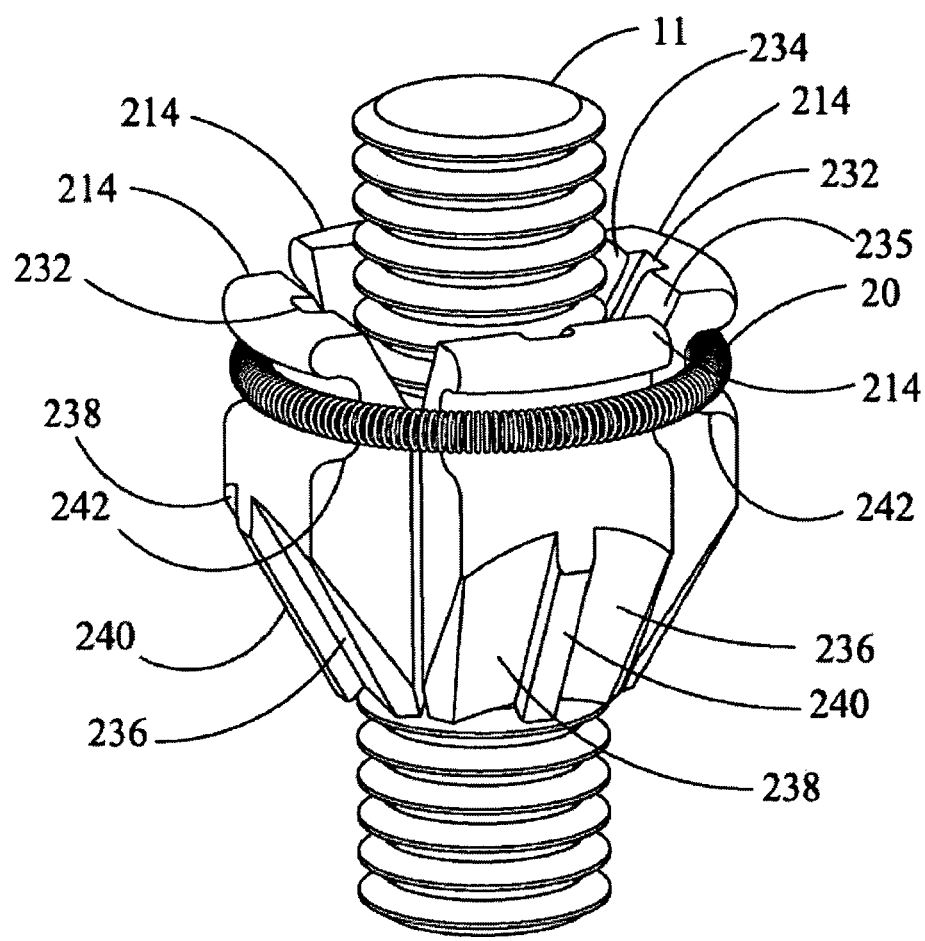

FIG. 13 is a top perspective view of four nut segments, coil spring and a threaded rod.

Figure 14:
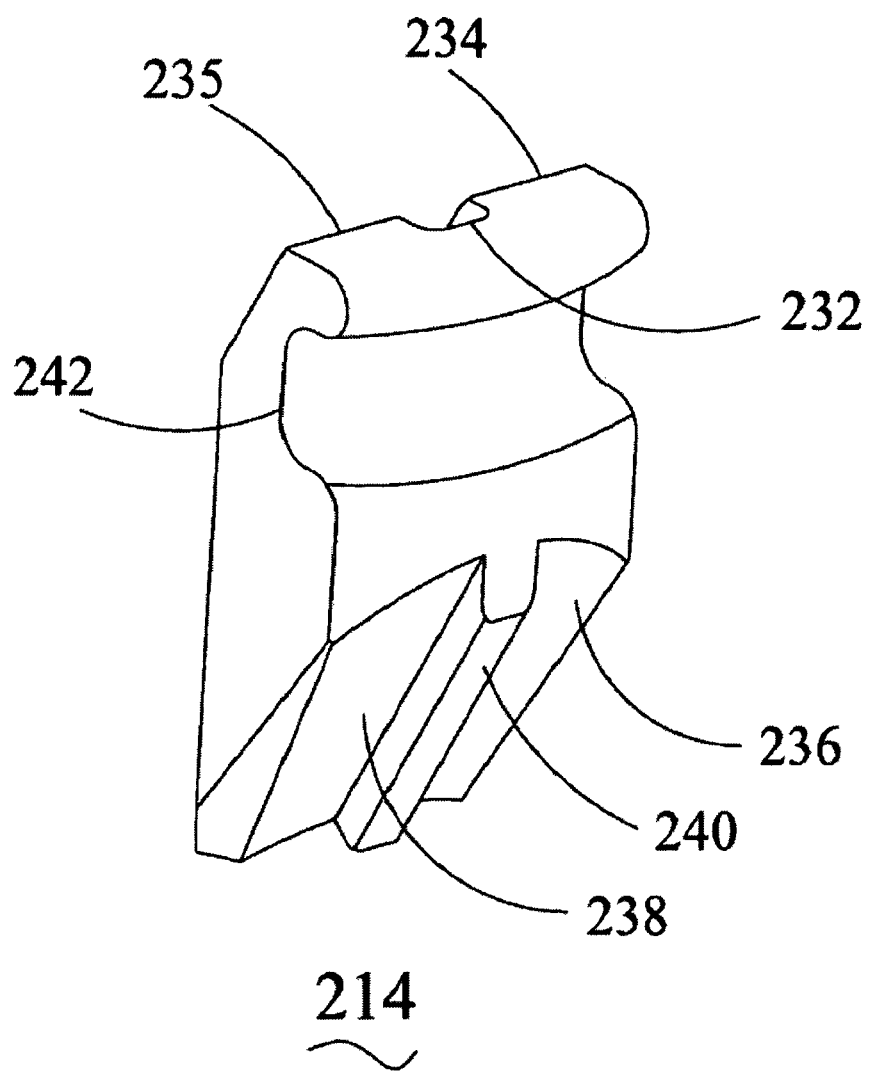

FIG. 14 is an expanded outer perspective view of a single nut segment.

Figure 15:
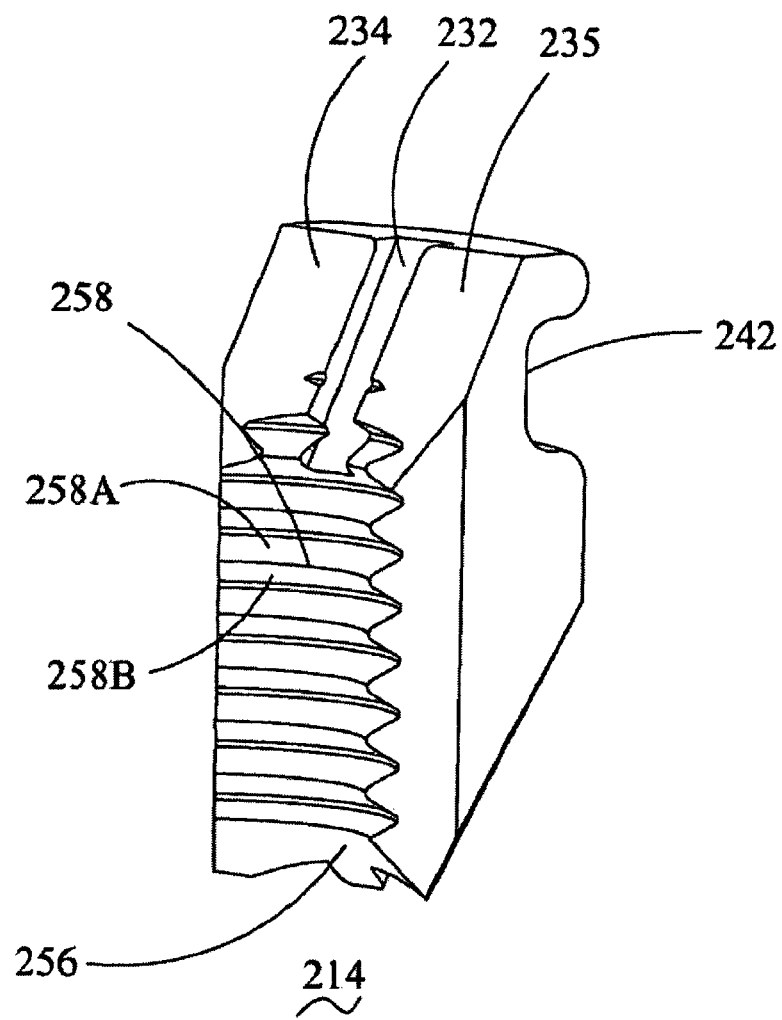

FIG. 15 is an expanded inner perspective view of a single nut segment with a single thread.

Figure 16:
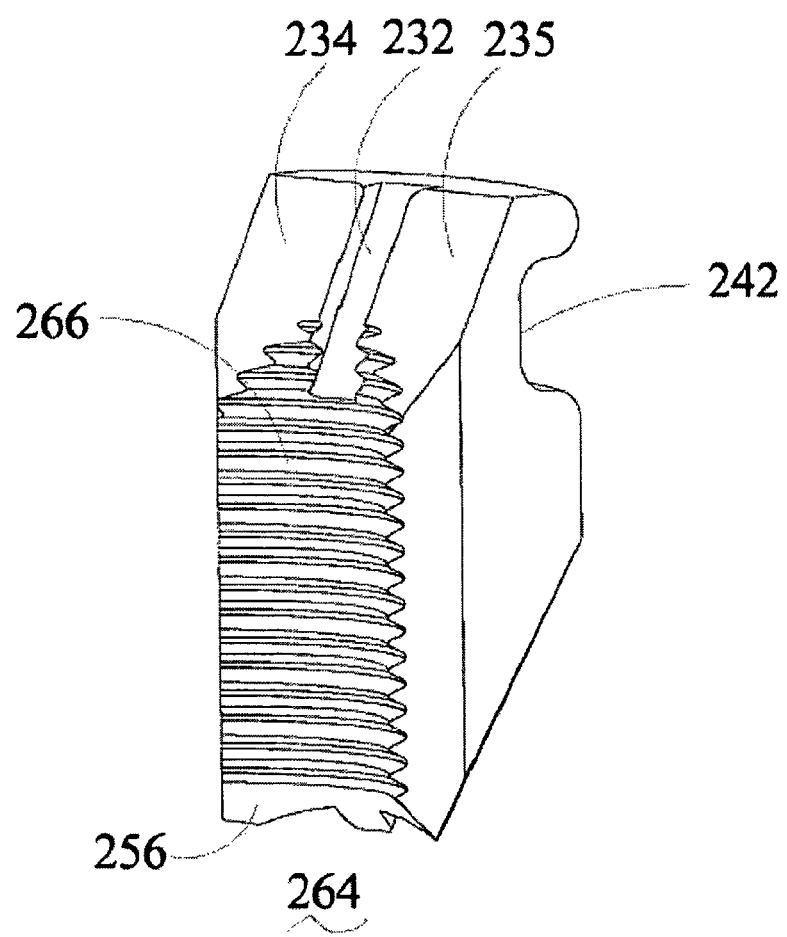

FIG. 16 is a close up inner perspective view of a single nut segment with a single thread.

Figure 17:
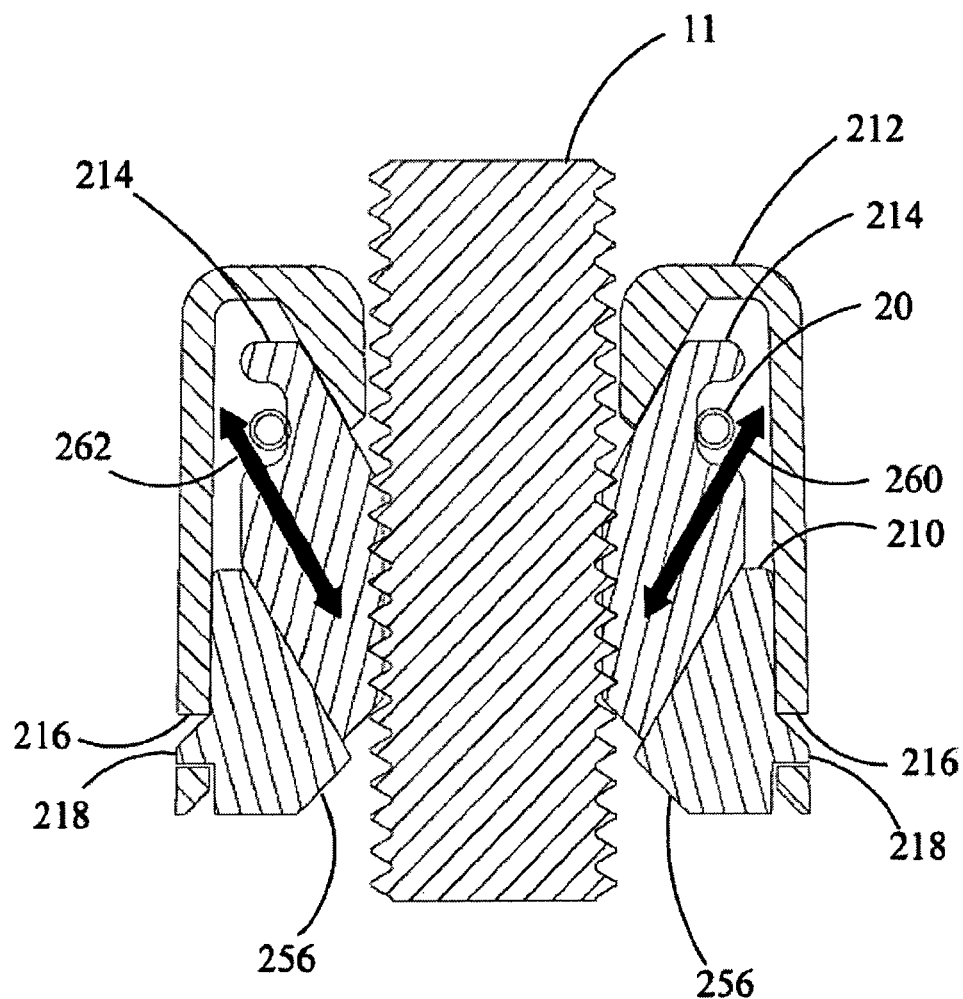

FIG. 17 is a cross-sectional view of a TCD and threaded rod depicting directions of segment motion.

Figure 18:
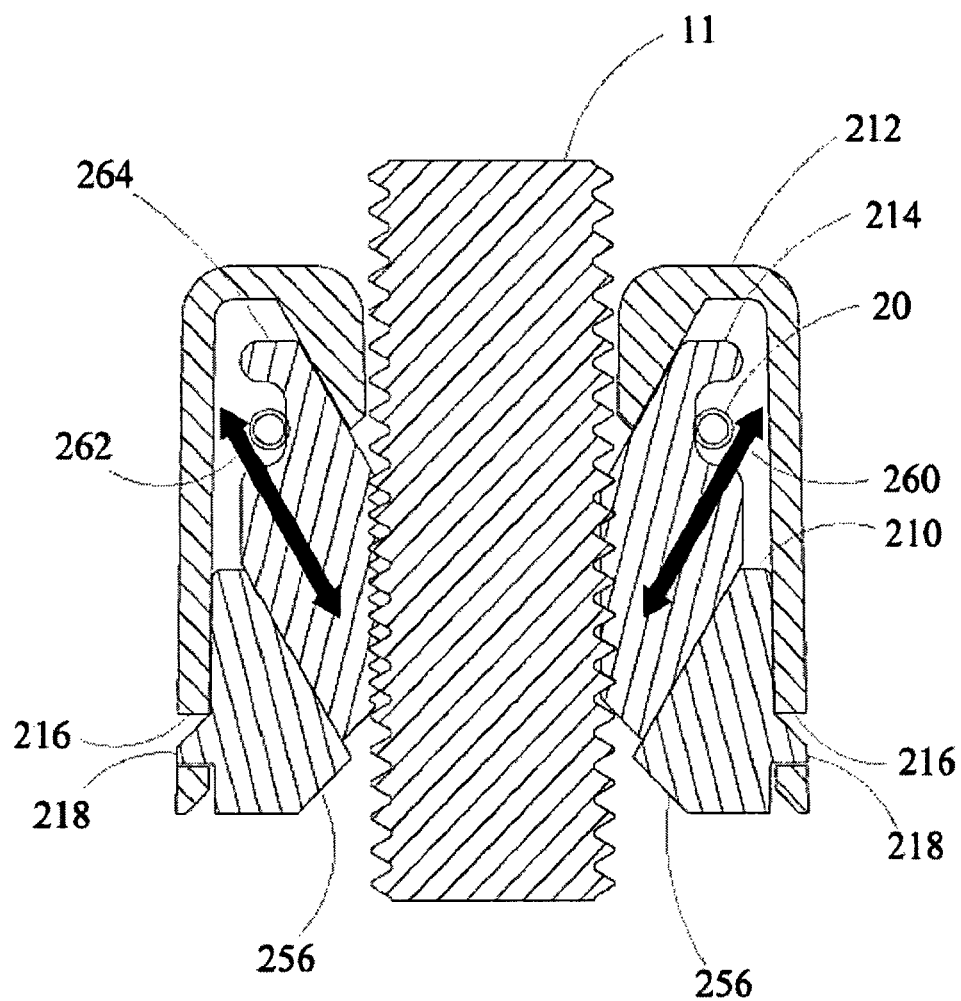

FIG. 18 is a cross-sectional view of a TCD and threaded rod depicting directions of segment motion with a double-threaded segment and single-threaded segment.

Figure 19:
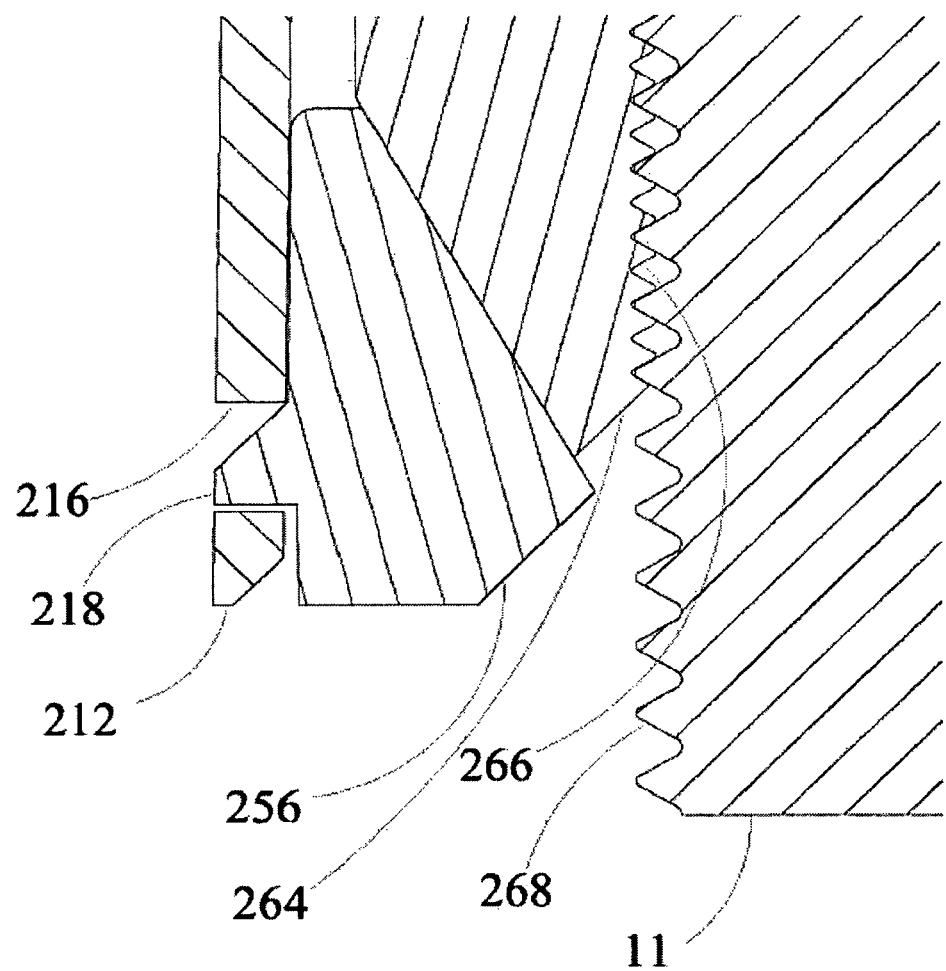

FIG. 19 is a cross-sectional expanded view of a TCD and threaded rod depicting a double-threaded segment engaging a single-threaded rod.

Figure 20:
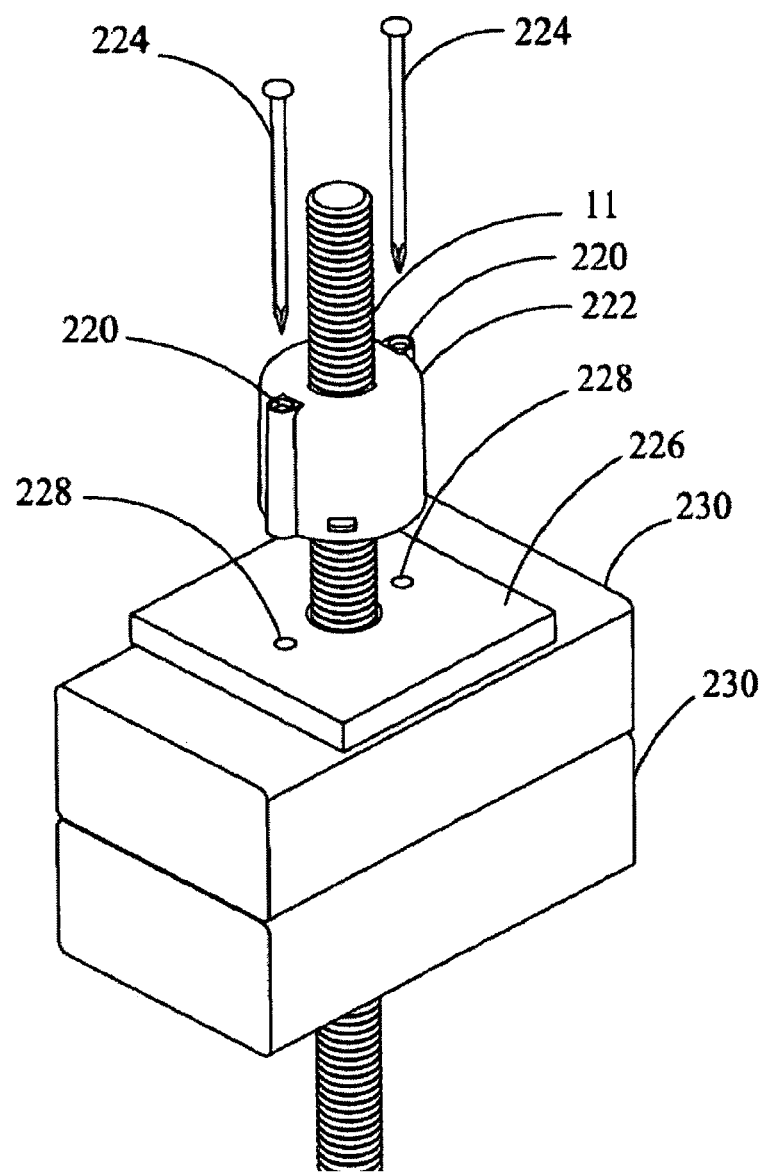

FIG. 20 is a perspective view of an assembly of TCD, mounting fasteners and bearing plate.

Figure 21:
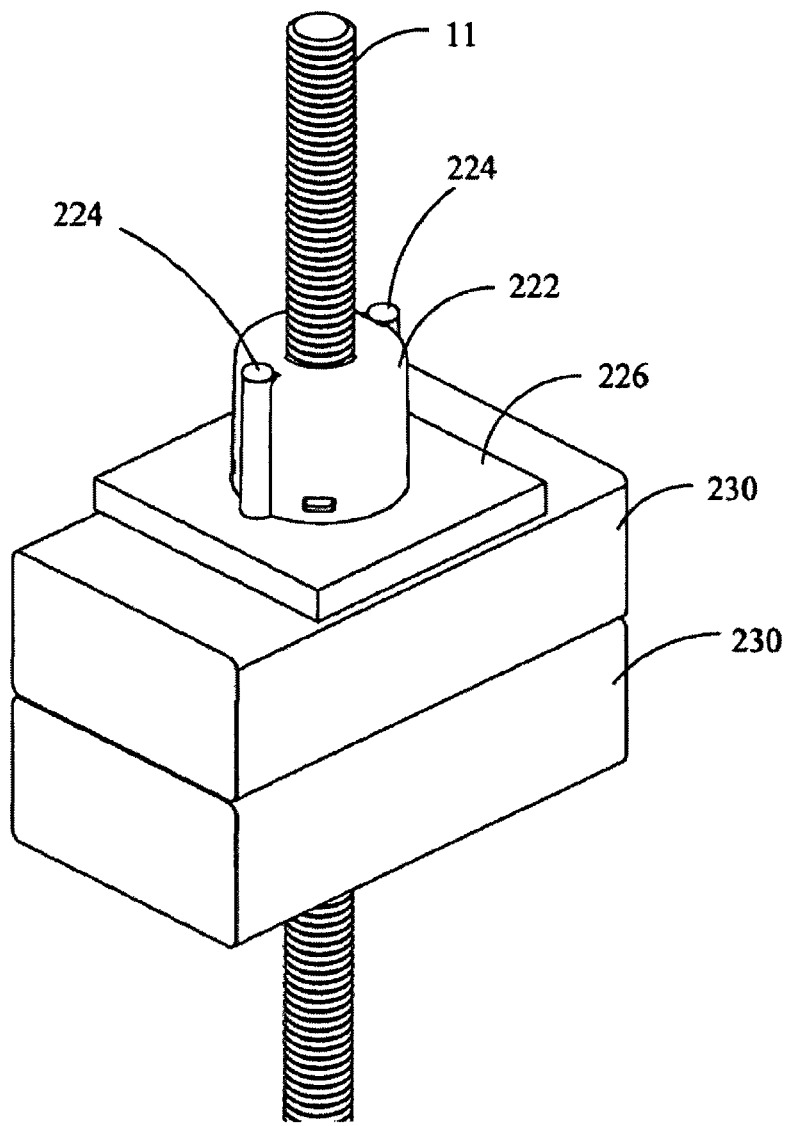

FIG. 21 is an expanded view of a TCD and bearing plate installed on a structure.

DETAILED DESCRIPTION

After considering the following description, those skilled in the art will clearly realize that the teachings of the invention can be readily utilized in the construction of thread clamping devices, self-adjusting shrinkage compensation devices, fasteners, among other structures and devices.

We describe herein a thread clamping device ("TCD") that engages with a threaded rod and can be moved without rotating in a ratcheting direction, but requires rotation and cannot be moved any significant distance by translation in the opposite non-ratcheting direction. The locking distance indicates the distance that the TCD moves before firmly engaging to the rod. It is shown that using double threads for at least a portion of the TCD structure leads to improved (shorter) locking distances. That is, a normally-threaded TCD has threads matching those of the rod with which it is to engage. A double-threaded TCD includes at least one segment having double threads (half the spacing) when measured in comparison with that of the rod (and the single-threaded segment(s), if any, of the TCD). Such a structure is shown to decrease the locking distance of the TCD but still engages with a standard-threaded rod.

At least one double-threaded component causes a thread ratcheting device such as the TCD to ratchet more often for a given displacement along a threaded rod than a TCD with only single-threaded components, even though the rod along which ratcheting occurs has standard single threads. Simply explained, there are two basic components to a conventional thread system, a threaded rod and a threaded nut. In a standard system both rod and nut have the same number of threads per axial inch of length (defined as "threads per inch"). Also, in standard thread systems there is only one continuous thread. One way to verify a single-threaded structure is to observe the threaded rod end-on. In a single thread system there will only be one thread start at the end of the rod. A double thread system will have two thread starts at the end of the rod with each thread start being 180 degrees opposite of the other (that is, diametrically opposite across the rod diameter). In other words, a double-threaded structure (rod or nut) has two interleaved threads making their way along the structure, and performs quite differently from a single-threaded structure having twice as many threads per inch.

A single-threaded rod will successfully engage a double-threaded nut so long as the helix angle of the (single) rod thread and (both) the nut threads are the same. The single rod thread will engage one or the other of the two (interleaved) nut threads, but not both at any one time. When a TCD having at least one double-threaded segment moves axially with respect to the single-threaded rod, the TCD will ratchet in approximately one-half the axial distance as would a TCD including only single-threaded segments. Since a double-threaded configuration has two threads in the same linear distance as the single thread in a single-threaded device, each of the double threads are one-half the size of a single thread of the same pitch and diameter. A possible disadvantage of engaging a double-threaded segment with a single-threaded rod is that there is less engagement area between the double threads and the single thread as there would be between two single threads of the same pitch and diameter, and therefore less force can be transmitted per thread. However, one may increase the total number of threads to be engaged (that is, use longer threaded segments engaging a longer distance along the rod) and therefore increase the thread engagement area to whatever is required.

FIG. 1 is a schematic, perspective view of a typical TCD 222 engaged to a threaded rod 11 in accordance with some embodiments of the present invention. FIGS. 2, 3 and 4 show a top view, a first side view and a second side view respectively of TCD 222, omitting rod 11.

FIG. 5 depicts an exploded or disassembled view of TCD 222 including an end housing 210, nut segments 214 supported by end housing 210, and a top housing 212 engaging end housing 210 with one or more tabs 218. Nut segments 214 are contained within top housing 212. Surrounding nut segments 214 is coil spring 20. For economy of language "nut segments" are also referred to as "segments" herein.

FIG. 6 depicts an exploded or disassembled view of TCD 222 including an end housing 210, nut segments 264 supported by end housing 210, and a top housing 212 engaging end housing 210 with one or more tabs 218. Nut segments are contained within top housing 212. Surrounding nut segments 264 is coil spring 20. Fastener holes are depicted as 220 in FIGS. 2, 5 and 6.

Note: 214 and 264 both refer to nut segments. However, "214" is typically used herein to denote nut segments having a threaded surface containing only a single thread, that is, threaded in the same manner as the threaded rod 11. "264" is typically used to denote a nut segment having a threaded surface with double threads. Various embodiments of the present invention can use single-threaded segments, 214, or double-threaded segments 264 in various combinations and locations as discussed in detail elsewhere. In addition, for discussing structural features of the nut segments not related to the single- or double-threaded nature of the threaded surface, we will typically use 214 rather than the pedantic "214 and/or 264," understanding thereby that nut segment features unrelated to the threaded surface apply equally to either type of segment.

FIG. 20 depicts mounting fasteners 224 (or "fasteners") passing through fastener holes 220 and plate fastener holes 228, attaching TCD 222 to the shrinking medium 230 (typically wood) shown in FIG. 20. Upon installation of mounting fasteners 224, bearing plate 226 is also attached in that bearing plate 226 is held securely between TCD 222 and the shrinking medium 230. While nails are depicted in FIG. 20 as the mounting fasteners 224, any other fastener can be used, such as screws, rivets, among others. Also, it is usually convenient, but not required, that the multiple fasteners 224 used to attach TCD 222 to shrinking medium 230 be identical, in that circumstances may arise in practice calling for different fasteners 224 for different fastener holes 220.

While the top housing 212 (or "housing") is shown with substantially cylindrical side surfaces, the housing 212 of the TCD 222 may include hexagonal, cubic, square and any other approximately tubular configuration capable of accommodating threaded rod 11, and which is capable of containing the components of the TCD 222 as discussed in further detail below.

FIG. 5 shows a typical complete TCD assembly 222 with the component parts exploded in a disassembled depiction. While four tabs 218 are depicted on end housing 210, and four tab holes 216 in top housing 212 used to couple top housing 212 to end housing 210 (there is generally one tab hole 216 for each tab 218), fewer or more tabs 218 and tab holes 216 in pairs may be used depending upon the shape of TCD 222. Coil spring 20 is shown above end housing 210. The components depicted in FIG. 5, when assembled, comprise a typical TCD.

FIG. 5 also shows slots 244 between end housing surfaces 246 and 248 in end housing 210. There are, in this example, four slots 244, four pairs of end housing surfaces 246, 248 arranged in a substantially equidistant polar array relative to central axis 8 (see FIG. 8) in TCD 222, all in end housing 210. In a typical symmetrical TCD 222, central axis 8 is coincident with the axis of the threaded rod 11. End housing surfaces 246, 248 and slot 244 are defined as a feature set. Slots 244, and end housing surfaces 246 and 248 advantageously form an angle of approximately 30 degrees relative to central axis 8. FIG. 5 also shows nut segment ribs 240, segment spring groove 242, right bearing surface 236 and left bearing surface 238. There is one nut segment rib 240, one segment spring groove 242, one right bearing surface 236 and one left bearing surface 238 for each nut segment 214.

A nut segment assembly 250 includes a plurality of nut segments 214 in various configurations. For a concrete description, the present example depicts four nut segments in a nut segment assembly, but this is not an inherent limitation. More or less nut segments can be used as would be apparent to those skilled in the art. Also, various configurations of nut segment assemblies are described within the scope of the present invention.

FIG. 7 is a top view of end housing 210. Shown in top view are end housing surfaces 246 and 248 and slots 244.

FIG. 8 shows slot 244 and end housing surfaces 246 and 248 as substantially parallel and at substantially a 30 degree angle with respect to central axis 8. Referring to FIG. 5, in an assembled configuration of nut segments in the end housing, right bearing surface 236 and bears against end housing surface 248 and left bearing surface 238 bears against end housing surface 246 for each of the four segments 214. End housing surfaces 246 and 248 lie in a plane separated into two surfaces by slot 244. Similarly, bearing surfaces (also called "segment surfaces") 236 and 238 lie in a single plane separated by nut segment rib 240.

FIG. 9 is an upper perspective view of end housing 210, depicting only two nut segments (214A, 214B) of the four in a full nut segment assembly in this example of a typical TCD. Segment 214A is shown in an engaged position and segment 214B is shown in an extreme disengaged position. It can also be observed that nut segment rib 240 resides substantially within slot 244. All segment ribs 240 reside in their respective slot 244.

FIG. 12 is a three dimensional bottom perspective view of a typical TCD with a portion of end housing 210 removed and portions of top housing 212 removed. Also, one nut segment 214 has been removed for clarity revealing internal ramps 252, 253, and center ribs 254. Four ramps 252, four ramps 253 and four center ribs 254 are depicted. However, there could be more or fewer depending on the relative sizes of the particular TCD under consideration and its internal components. The internal ramps 252 and 253, and center ribs 254 comprise a portion of top housing 212 and have an orientation substantially parallel to respective end housing 210, end housing surfaces 246 and 248. The internal ramps 252 and 253 are configured in pairs. Each internal ramp pair engages a single nut segment 214 at that segment's left nut segment top surface 234 and right nut segment top surface 235, as depicted in FIG. 5. For economy of language, we call 234 and 235 "segment top surfaces." Each ramp pair (252, 253) is arranged in a quadrature polar array about axis 8. (See FIGS. 5, 9, 10, 13, 14, 15 and 17). Also shown are four tabs 218 extending outwardly from end housing 210.

FIG. 13 is a three dimensional perspective view of four nut segments 214 encircled by coil spring 20 comprising nut segment assembly 250 and engaged on threaded rod 11. It is shown that, in the assembled configuration, coil spring 20 resides in segment spring groove 242 in each segment 214 respectively. The segments are shown in FIG. 10 in the same position with respect to threaded rod 11 as they are depicted in FIG. 13.

FIG. 14 is a three dimensional outer perspective view of one nut segment 214 of a typical nut segment assembly as would be used in a typical TCD 222 in accordance with some embodiments of the present invention. Shown in this illustration is segment spring groove 242, left bearing surface 238, right bearing surface 236 and nut segment rib 240.

FIG. 15 is a three dimensional inner perspective view of a nut segment (or "segment") 214, a component of the typical nut assembly 250 of TCD 222. Also shown are left and right nut segment top surfaces 234 and 235 respectively, segment spring groove 242, nut segment slot 232 and single segment thread 258.

FIG. 16 is a three dimensional inner perspective view of a nut segment 264 of nut assembly 250 of TCD 222. Also shown are left and right nut segment top surfaces 234 and 235 respectively, segment spring groove 242, nut segment slot 232 and a double segment thread 266.

FIG. 17 is a cross-sectional view of TCD 222 engaged with threaded rod 11 in accordance with some embodiments. Also shown in cross-section are any two opposing nut segments 214, coil spring 20, end housing 210 and top housing 212. Also shown in FIG. 17 are segment motion directions 260 and 262. Other features shown are tabs 218 and tab holes 216.

FIG. 18 is a cross-sectional view of TCD 222 engaged with threaded rod 11 in accordance with some embodiments. Also shown in cross section are two opposing nut segments, 214 and 264, coil spring 20, end housing 210 and top housing 212. Nut segments 214 and 264 may be in any combination in nut segment assembly 250. Also shown are motion directions 260 and 262. Other features shown are tabs 218 and tab holes 216.

FIG. 19 is a cross-sectional view of TCD 222 engaged with threaded rod 11 in accordance with some embodiments. Also shown in cross section is an enlarged view of segment 264 and its double-threaded surface 266 engaged with threaded rod 11 that has a standard single thread 268. Other features shown are tabs 218 and tab holes 216.

In many applications, the nature of rod 11, including its thread structure, is fixed by various building codes or other mandated standards. Thus, in such circumstances the nature of the threaded rod 11 is "given" and not subject to modification to come into conformity with the TCD to be used. However, as is clear in FIG. 19 and from the general nature of double threads, double-threaded nut segment 264 readily engages with single-threaded rod 11.

FIG. 20 is a top perspective exploded view of TCD 222, fasteners 224 and bearing plate 226. Also shown is plate fastener hole 228 in bearing plate 226 above shrinking medium 230.

FIG. 21 is a top perspective view of TCD 222, mounting fasteners 224 and bearing plate 226 shown installed to the shrinking medium 230 and engaged to threaded rod 11. This combination of TCD 222, mounting fasteners 224 and bearing plate 226 comprises a typical-self-adjusting shrinkage compensation device.

In FIG. 1, TCD 222 may be configured to move along threaded rod 11 in one direction without rotation of TCD 222, and to resist movement in the opposite direction without rotation. For the purposes of describing various embodiments of TCD 222, the direction of motion whereby TCD moves along threaded rod 11 without rotation of the TCD shall be defined as the "ratcheting direction" and the opposite direction of motion as the non-ratcheting direction. However, even in the ratcheting direction, rotation of the TCD about the threaded rod will cause the TCD to move along the rod, but ratcheting in this direction without rotation is also possible. In particular, in accordance with some embodiments, TCD 222 may be configured to be engaged to threaded rod 11 such that a single downward hand movement of TCD 222 down the length of threaded rod 11 will correspondingly move TCD 222 in the ratcheting direction, to a desired position on threaded rod 11. Once in place, an upward hand movement of TCD 222 along the length of threaded rod 11 will be met with an equal and opposite force such that TCD 222 will not move in the non-ratcheting direction. Rather, in order to move TCD 222 in the upward, non-ratcheting direction of threaded rod 11, TCD 222 requires rotation along the threads of threaded rod 11. The most common configuration with respect to TCD 222 engaged to a vertical threaded rod 11 is where (when viewed from above) a clockwise rotation of TCD 222 will advance TCD 222 downward with respect to threaded rod 11 and a counter-clock wise rotation of TCD 222 will advance TCD 222 upward with respect to threaded rod 11.

It should be noted that while the above description is given in terms of upward and downward hand movements of TCD 222 along the length of threaded rod 11, the direction of the movements of TCD 222 may be arbitrary depending upon, for example, the position of threaded rod 11 on which TCD 222 is engaged.

In some embodiments, TCD 222 will ratchet whenever TCD 222 is moved along threaded rod 11 a minimum of one-quarter (¼) of a thread pitch in the ratcheting direction. That is, when TCD 222 moves one-quarter of a thread pitch one of the segment pairs will ratchet such that, if forces try to move the nut assembly in the opposite non-ratcheting direction, a minimum of one nut segment will lock up and prevent motion in the opposite, non-ratcheting direction with respect to threaded rod 11. One configuration implementing ¼ thread ratcheting includes four identical segments 214 arranged in all four segment positions as depicted, for example in assembly 250 shown in FIG. 5.

In other embodiments, TCD 222 ratchets whenever TCD 222 is moved along threaded rod 11 a minimum of one-eighth (⅛) of a thread pitch in the ratcheting direction. That is, when TCD 222 moves one-eighth of a thread pitch, one of the segment pairs will ratchet such that, if forces try to move the nut assembly in the opposite non-ratcheting direction, a minimum of one nut segment will lock up and prevent motion in the opposite direction with respect to threaded rod 11. To implement ⅛ thread ratcheting four identical segments 264 are arranged in all four positions.

In particular with respect to FIG. 12, FIG. 13, FIG. 14, FIG. 15 and FIG. 17, each of the four segments are driven upwards and outward at an angle of about 30 degrees relative to central axis 8 as a result of nut segment top surfaces 234 and 235 contacting internal ramps 252 and 253 (FIG. 12) as threaded rod 11 is pushed upward, for example, by seismic movement or winds that cause building over-turning moments. Overturning moments cause a structure to move up and down with respect to its foundation. In this case, with enough linear movement 260 and/or movement 262 (FIG. 17), segments 214 will completely disengage threaded from the threads of threaded rod 11, and re-engage when the next thread of rod 11 moves into position to allow the four segments 214 to move toward the center of rod 11 and re-engage the threads of threaded rod 11.

On the other hand, if the forces reverse in direction and threaded rod 11 is driven down (or TCD 222 is driven up), nut segments 214 will be driven toward threaded rod 11, and the threads will stay engaged (as long as the downward force exists) because of the inward radial force pushing segments 214 toward threaded rod 11. The inward radial force is generated by end housing surfaces 246 and 248 of end housing 210 contacting surfaces 238 and 236 respectively of segment (FIGS. 5, 7, 8). Also to be considered is the outward radial force caused by the interaction of the thread flanks of rod 11 against segment thread's flank (for example, 258A, 258B of FIG. 15). The inward radial force relative to axis 8 on segments 214 overcomes the outward radial force on segments 214 as long as the included angle between thread flanks (258A and 258B in FIG. 15) remains substantially 60 degrees (which is the standard flank angle for American Standard and Metric threads), and the angle of end housing surfaces 246, 248, and bearing surfaces 238 and 236 remain substantially 30 degrees relative to axis 8, and the reversing forces are in effect. The resultant inward forward force keeps the segments 214 engaged with threaded rod 11.

Moreover, in some embodiments the material used for nut segments 214 may have a yield point greater than or equal to that of the material of threaded rod 11. Even when the yield points are reasonably close between the materials for threaded rod 11 and segments 214, and one segment 214 begins plastic deformation, as soon as threaded rod 11 moves, other segments 214 will start to engage threaded rod 11 to overcome the strength of threaded rod 11.

Alternatively, the material used for nut segments 214 may have a yield point substantially lower than that of threaded rod 11, in which case threaded rod 11 will still fail (i.e., give way or break off) before TCD 222 is compromised if there is sufficient length of thread engagement.

Moreover, coil spring 20 in some embodiments is configured to have sufficient tension to cause nut segments 214 to close around threaded rod 11 even in the case where the gravitational force is pulling nut segments 214 away from threaded rod 11 (for example, in the case where TCD 222 is inverted). Indeed, if nut segments 214 are not driven toward threaded rod 11 center by the force exerted by the coil spring, nut segments 214, may move to the outside of the wall of top housing 212 and remain in that position resulting in TCD 222 not engaging with threaded rod 11.

Referring to FIG. 17, the segment motion directions 260 and 262 illustrate the manner in which nut segments 214 are configured to move when TCD 222 moves in the ratcheting direction with respect to threaded rod 11.

Referring to segments 214, the engagement of nut segment ribs 240 and slots 244 provide linear guidance and transfer torque to nut segments 214. The nut segment ribs 240 and slots 244 are configured to engage one another. Nut segment ribs 240 appear on segments 214. The matching slots 244 appear on end housing 210. When torque is applied to end housing 210 this torque is transmitted to segments 214 through slots 244 engaging nut segment ribs 240. Additionally, the nut segment ribs and slots also guide the radial motion engagement of TCD 222 to threaded rod 11. Torque may be applied to end housing 210 through top housing 212.

Referring to FIGS. 3, 4, 5, 7, 8, 9, 10, 12 and 17, torque is transmitted from the top housing 212 to end housing 210 through tab holes 216 on top housing 212 engaging tabs 218 on end housing 210. Torque is also transmitted directly from the top housing to nut segments by center rib 254 (FIG. 12) engaging nut segment slot 232. The tab holes 216 and tabs 218 also perform a fastening function and facilitate automatic assembly of the top housing 212 to the end housing 210. During final assembly the top housing tab holes 216 are aligned over the end housing tabs 218 and then the top housing 212 is pushed down over the end housing 210. The tabs 218 force the wall of top housing 210 outward over the tabs 218 until the downward motion of the top housing 210 allows the tabs 218 to snap into the tab holes 216. The top housing 212 now cannot be removed from the end housing 210 without damage to the top housing 212. This accomplishes the final assembly of the TCD 222 without the use of fasteners.

Referring to FIGS. 8 and 12, there is lead-in 256, advantageously conical in shape although other shapes are not excluded, which guides the TCD 222 over the threaded rod 11 upon initial engagement of TCD 222 to the end of threaded rod 11. The conical lead-in 256 causes the installation of TCD 222 to be quick and easy as the conical lead-in 256 guides the end of threaded rod 11 to the center of TCD 222 and to the bottom of nut segments 214. The nut segments 214 then move as depicted in to FIG. 17 as described in more detail elsewhere.

With respect to top housing 212, it should be noted that some embodiments of this invention require torque to be applied to housing 212 in order to tighten or loosen TCD 222 with respect to threaded rod 11. Application of torque is typically applied with a wrench, pliers or other device engaging exterior flats of a housing equivalent in function to top housing 212 but including exterior flat surfaces to facilitate gripping.

It should be clearly understood that the threads of the TCD's nut segments may, but need not, be identical from segment to segment. Indeed, completely identical thread structures in adjacent segments (single- or double-threaded) will have the proper phasing to form a single continuous thread around the interior of nut segment assembly, 250, only if the segments are vertically displaced with respect to each other. But such configurations nevertheless perfectly acceptable configuration in some embodiments. Other acceptable configurations include distinct nut segments having proper thread phasing to form a single continuous internal thread. Various combinations of single- and double-threaded segments are also acceptable in some embodiments, recognizing that at least one double-threaded segment is needed to achieve a shorter locking distance. Indeed, some advantages can be expected to result from having two different thread structures in the same device.

To illustrate the potential advantages of employing different thread structures, we consider a nut segment assembly having four segments, as in 250. However, this is not an essential limitation and other numbers of nut segments can be employed and still achieve the advantages described herein.

For example, in the case of a nut segment assembly having four segments with two thread types ("TT"), TT-A and TT-B, the segments having the same thread types are located diametrically opposite across central axis 8, or in other words, circumferentially alternating A-B-A-B, denoted as TCD(ABAB). For example, if TT-A were an American National Standard for Unified Screw Threads, and TT-B were from the International Metric System, then TCD(ABAB) could successfully be used with either of two threaded rods, one having TT-A or another having TT-B so long as the diameters of the two rods were sufficiently similar so both would accommodate TCD(ABAB), typically within about 25% of having the same diameter.

In addition, TT-A could be a right-hand thread type (standard configuration), while TT-B could be a left-hand thread type (non-standard configuration). This embodiment of TCD (ABAB) would successfully engage either a right-handed-threaded rod (TT-A) as well as a left-handed-threaded rod (TT-B) with two of the four nut segments engaging each type of rod. Since two of the TCD(ABAB) nut segments can be configured to be stronger than the engaged rod, maximum usable strength can be present in this form of TCD(ABAB) even with two unengaged segments.

In addition, a functioning TCD can be constructed when TT-A is a coarse thread (such as UNC-Unified National Coarse), while TT-B is a fine thread (such as UNF-Unified National Fine). Numerous other configurations of thread types and arrangements of nut segments within the nut segment assembly, following the teachings presented herein, will be apparent to those having ordinary skills in the art.

Various other modifications and alterations in the structure and method of operation of this invention will be apparent to those skilled in the art without departing from the scope and spirit of the invention. Although the invention has been described in connection with specific embodiments, it should be understood that the invention should not be unduly limited to such specific embodiments.

Although various embodiments which incorporate the teachings of the present invention have been shown and described in detail herein, those skilled in the art can readily devise many other varied embodiments that still incorporate these teachings.

I claim:

1. A ratcheting thread clamping device comprising:
   a) a top housing and an end housing surrounding a plurality of movable nut segments wherein each of said movable nut segments has a threaded inner surface suited for engaging a single-threaded rod; and wherein the outer bearing surface of each of said movable nut segments engages the inner surface of said end housing along at least one substantially planar surface; and
   b) at least one spring flexibly directing said movable nut segments against said single-threaded rod; wherein said ratcheting thread clamping device moves axially along said single-threaded rod in a first direction without rotation and does not so move in a second opposite direction without rotation; and
   c) wherein said threaded inner surface of at least one of said movable nut segments has a double thread structure wherein each of the two interleaved threads comprising said double thread structure has substantially the same helix angle as the threads of said single-threaded rod, thereby reducing the locking distance of said ratcheting thread clamping device when engaged with said single-threaded rod.

2. A ratcheting thread clamping device as in claim 1 having four of said movable nut segments.

3. A ratcheting thread clamping device as in claim 1 wherein said threaded inner surfaces of said movable nut segments form a continuous spiral thread with said nut segments in alignment.

4. A ratcheting thread clamping device as in claim 1 wherein, for each of said nut segments, the segment top surfaces and bearing surfaces lie in substantially parallel planes.

5. A ratcheting thread clamping device as in claim 4 wherein said movable nut segments have identical double thread structures and thread phases.

* * * * *